Feb. 17, 1970  J. G. HURST ET AL  3,495,634
LEVEL SENSITIVE CONTROL APPARATUS
Filed June 20, 1966  4 Sheets-Sheet 1

# United States Patent Office 3,495,634
Patented Feb. 17, 1970

3,495,634
LEVEL SENSITIVE CONTROL APPARATUS
John G. Hurst, 15 Rotherwick Road, London, NW. 11, and David H. Young, 118 Abbotsbury Gardens, Eastcote, Pinner, Middlesex, both of England
Filed June 20, 1966, Ser. No. 558,863
Int. Cl. B65b *31/00, 1/30, 3/28*
U.S. Cl. 141—40        15 Claims

ABSTRACT OF THE DISCLOSURE

A control device for controlling the filling of casks or the like with a liquid fed thereto by a fill nozzle through a flow line having a main valve operated by a pneumatically operated jack or other pressure fluid operating means. A pressure fluid supply conduit separate from the flow line connects the pressure fluid operating means to a source of pressure fluid and has a control valve including a pressure sensitive diaphragm mechanism connected to actuate the control valve by controlling the supply of pressure fluid to the jack or other pressure fluid operating means. A sensing conduit terminates in an orifice located at a level to which it is desired to fill the cask, and the sensing conduit includes venturi means for causing a flow through the orifice, and connects with the pressure sensitive diaphragm mechanism in a manner that when the diaphragm is subject to a changed or negative pressure in the sensing conduit, it operatively moves the control valve to control the pressure fluid operating means thereby automatically terminating the liquid fill of the cask. Other fluid pressure operated means associated therewith acts to lift the fill nozzle from the cask and to permit removal and replacement of the filled cask.

---

This invention relates to control apparatus.

According to one aspect of the invention there is provided apparatus for controlling the flow of material through a flow line comprising a main valve in the flow line, pressure fluid operated means controlling the main valve, a pressure fluid supply conduit separate from the flow line connecting the said pressure fluid operated means to a source of pressure fluid, a control valve in the said supply conduit, pressure sensitive actuating mechanism connected to actuate the control valve, an orifice connected to the pressure sensitive actuating mechanism and flow means for causing a flow through the orifice thereby to affect the pressure sensitive actuating mechanism, the arrangement being such that when the orifice is obstructed the pressure sensitive actuating mechanism is subjected to a changed pressure so as operatively to move the control valve thereby to affect the operation of the pressure fluid operated means. The orifice is preferably adapted to be obstructed by liquid reaching a predetermined level but in a modified arrangement there may be provided means operable by a weighing machine or the like to obstruct the orifice when a certain weight is measured by the weighing machine.

Preferably the pressure sensitive actuating mechanism comprises a chamber having therein a movable member, preferably a diaphragm, connected by rod or the like to the movable member of the control valve. Spring means are preferably provided biasing the control valve into the closed position.

Preferably the control valve comprises a casing having an inlet port, a control valve member which closes the inlet port and which when moved off the port exposes an enlarged pressure surface to the pressure of the fluid at the port so that the control valve member will be subject to an increased valve opening force.

The control apparatus preferably further comprises a main valve in a conduit, which main valve is movable by the fluid pressure operated device, that is, preferably a piston and cylinder device. The pressure fluid operated device is preferably pneumatically operable but it could also be hydraulically operable.

The flow means preferably is adapted to cause suction through the orifice and the pressure sensitive actuating mechanism, and where the main valve controls fluid flow through a filling nozzle which passes fluid into a container, the nozzle may itself constitute the venturi tube but preferably a separate venturi tube is provided.

Figure 1:
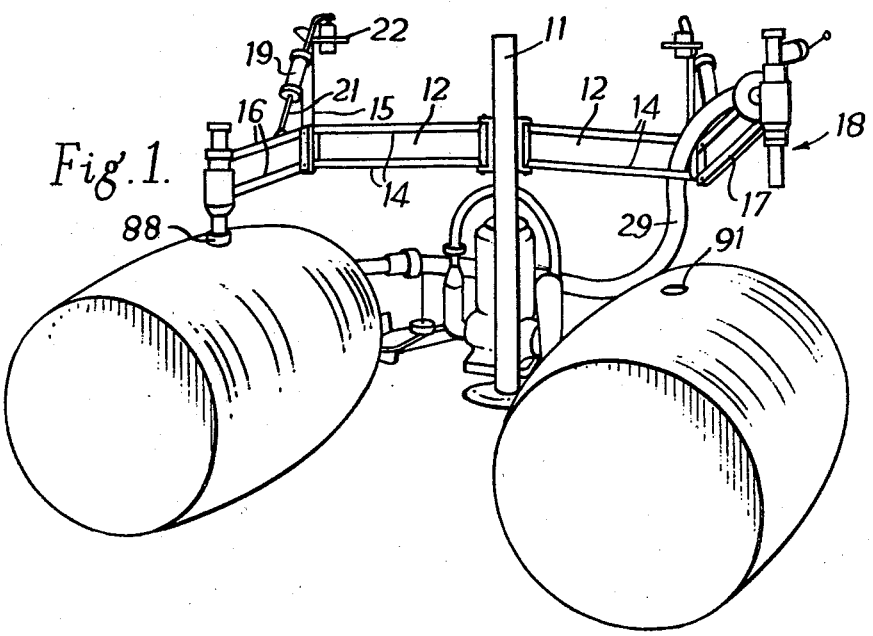
Figure 2:
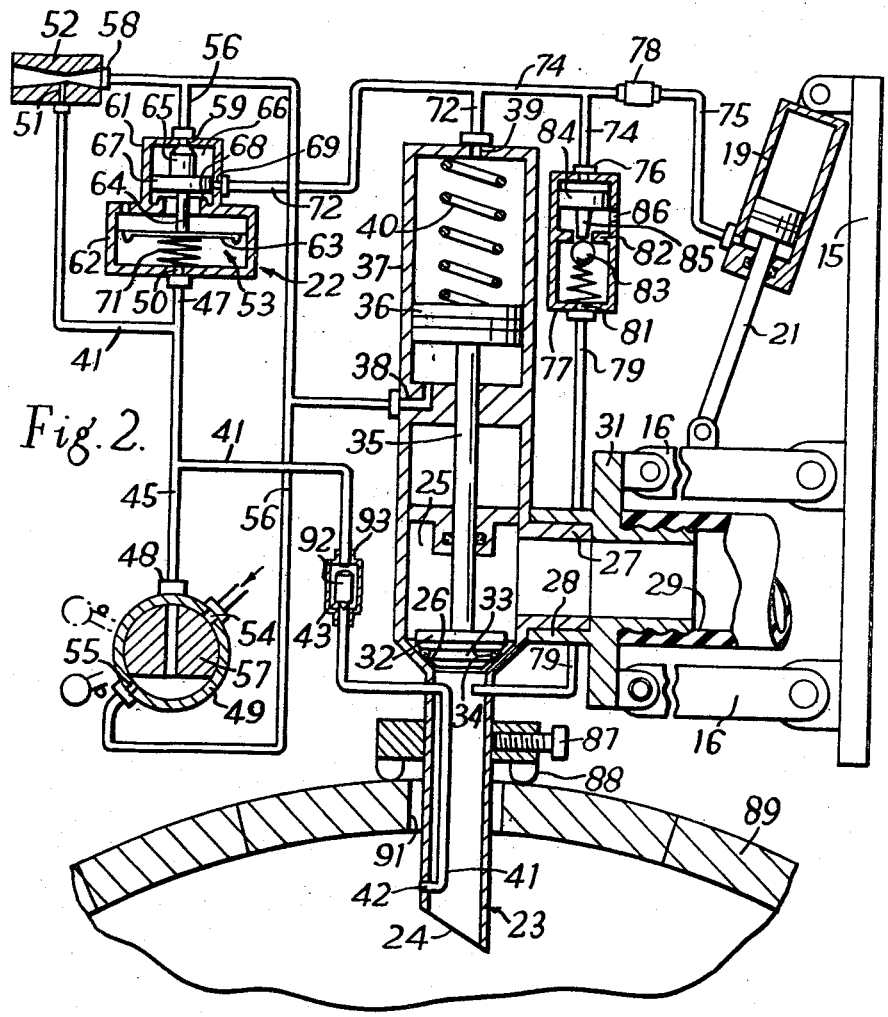
Figure 3:
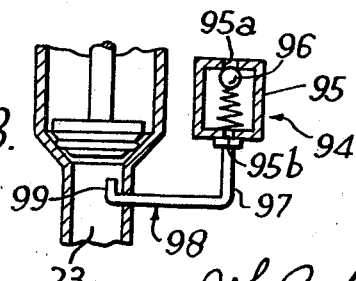
Figure 4:
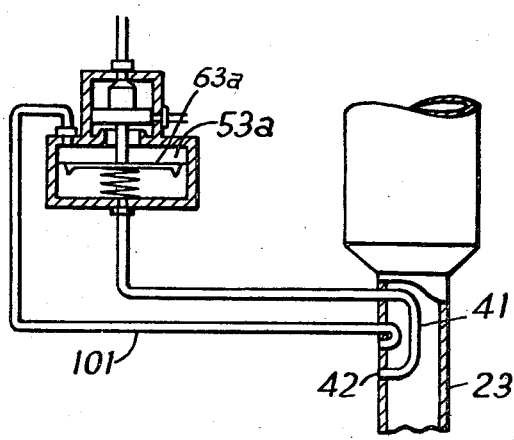
Figure 5:
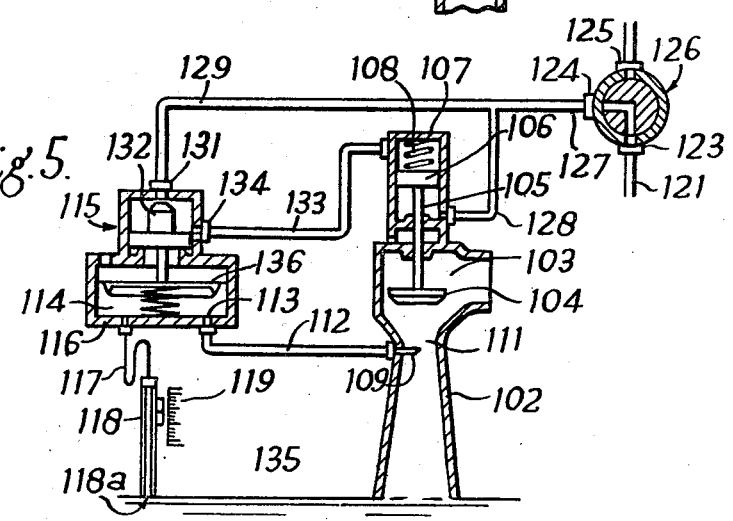
Figure 6:
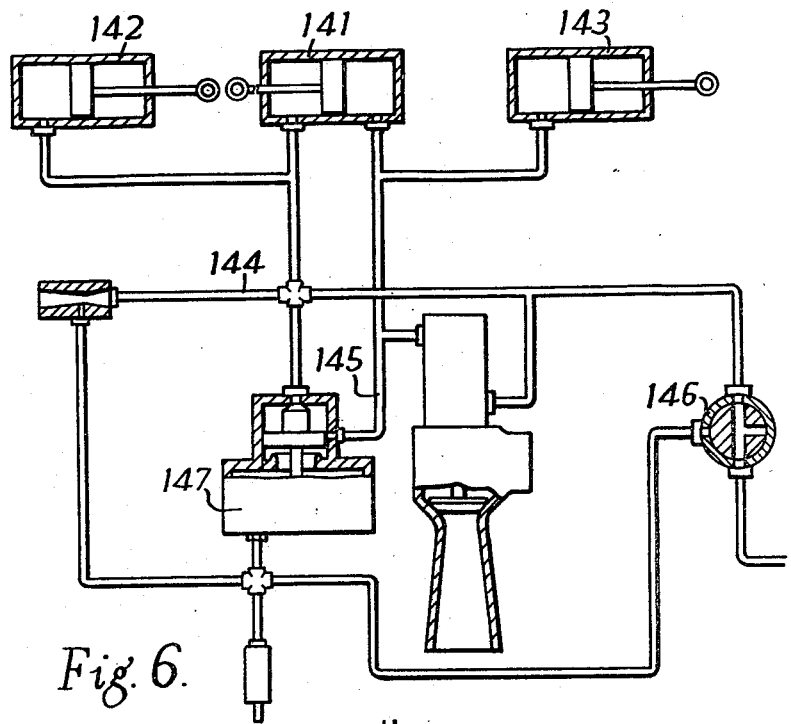
Figure 7:
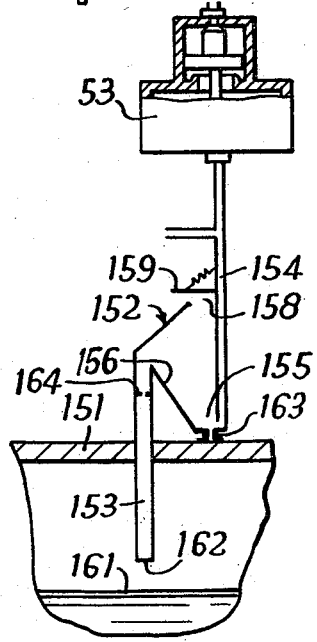

A number of embodiments of the invention will now be described, by way of example, with reference to the accompanying drawings, in which:

FIGURE 1 is a perspective view of a two cask filling machine embodying the invention and with certain parts omitted for clarity, FIGURE 2 is a detail of a part of the machine of FIGURE 1 with certain parts shown diagrammatically, FIGURE 3 is a detail showing a modification of FIGURE 2, FIGURE 4 is a detail showing another modification of FIGURE 3, FIGURE 5 is a diagrammatic view of a modified arrangement of the invention, FIGURE 6 is a view similar to FIGURE 5 of a further modified arrangement of the invention, and FIGURE 7 is a diagrammatic view of a sensing device for counterpressure filling of, for example, beer.

Referring now to the drawings, in FIGURE 1 there is shown a two cask filling apparatus with certain parts omitted for clarity. This apparatus comprises a main vertical shaft 11 to which two arms 12 are pivoted. Each arm 12 which comprises a pair of parallel struts 14 has at its free end an elongated vertical member 15 to which two parallel struts 16 forming a parallelogram movement 17 are pivoted. At the ends, each parallel movement linkage 17 carries a nozzle device 18 as will be described. At the upper end of each member 15 there is a lifting jack 19, the piston rod 21 of which is connected to the upper strut 16. Also carried by this member 15 is a control valve 22 arranged for the purpose that will be described.

Referring now to FIGURE 2, the nozzle device 18 is shown in more detail and the control means are shown in diagrammatic form. The nozzle 23 itself is generally cylindrical in form and its end 24 is obliquely cut. Above the nozzle there is a header chamber 25 having tapering side walls 26 leading to the nozzle 23. This chamber 25 has an inlet boss 27 carrying a flanged union member 28 connected to a liquid filling pipe 29 which with the header chamber 25 and nozzle 23 constitutes the flow line for the liquid to be placed in the casks. The flange 31 of union member 28 is connected to the parallel linkage struts 16. Within the chamber 25 there is a main valve 32 having a frusto-conical face in which is formed a recess 33, containing an O ring 34 so that the main valve 32 may seat on the sealing formed by the tapered side walls 26. This valve member 32 is carried on an elongated stem 35 formed by the piston rod of a piston and cylinder motor which comprises a piston 36 working in a pneumatic cylinder 37 arranged coaxially above the nozzle 23. A compression spring 40 acts on the piston 36 to urge the valve member 32 on to its seating 26. Ports 38 and 39 are provided at each end of the cylinder 37.

A sensing conduit 41 formed by a one-eighth of an inch bore stainless steel tube is contained within the nozzle 23. This conduit 41 extends through a port 42 in the side of the nozzle 23 a suitable distance from the tapered end 24 thereof and terminates in a sensing orifice. The conduit 41 leaves the nozzle 23 near the header chamber 25 and leads, via a shuttle valve 43, to the throat 51 of a venturi tube 52. This sensing conduit 41 has two branches 45 and 47 which lead repsectively to one port 48 of a manually controllable inlet valve 49, and a port 50 leading to the large chamber 53 of the control valve 22. Flow through the venturi tube 52 from the pressure fluid supply conduit causes a flow of air into the sensing orifice at port 42 and thence along the sensing conduit 41 to the throat 51.

The manually controllable valve 49 has three ports 48, 54 and 55. One port (54) is connected to a source of air under pressure (not shown). A second port 55 is connected to primary pneumatic pressure supply conduit 56 and the third port 48 is connected to the branch 45 of the sensing conduit 41 as mentioned above. The valve member 57 of the manually operable valve 49 is movable between "Fill" position and a "Reset" position; in the former of which the first and second ports (54 and 55) are interconnected and in the latter the third and second ports (48 and 55).

The primary pneumatic conduit 56 is connected upstream of the control valve 22 to the port 38 in the end of the main cylinder 37 nearest the main valve 32. This conduit 56 is further connected to the orifice 58 of the venturi tube 52 and to the valve controlled port 59 of the diaphragm-operated control valve 22.

The venturi tube 52 is of small dimensions having an orifice 58 of less than one-sixteenth of an inch in diameter.

The body of the control valve 22 is in the form of two concentric cylinders 61 and 62 with the smaller cylinder 61 above the larger 62. The larger cylinder 62 forms the larger chamber 53 and contains a diaphragm 63 which is thus sensitive to the pressure in the sensing conduit 41 after diaphragm 63. Mounted on a short rod 64 carried by the diaphragm 63 is a control valve member 65 which is contained in the valve chamber 66 formed by the smaller cylinder 61. The control valve member 65 has a piston portion 67 which is slidably mounted in the cylinder 61. The end of the control valve member 65 seats the downstream side of the port 59 which is formed in an end of the valve chamber 66. The piston 67 seats on a seating 68 formed between the two chambers 66 and 53 when the control valve member 65 is open. An outlet port 69 is formed in the side of the valve chamber 66 so that when the valve flange 67 seats on the seating 68 as aforedescribed the two ports 59 and 69 will be in communication. A spring 71 within the larger chamber 53 acts on the diaphragm 63 to urge the control valve member 65 towards the closed position. The main valve chamber 53 has a vent on the side of the diaphragm 63 nearer the valve chamber 66. The control valve member 65 is quick acting, that is to say, immediately after the control valve member 65 cracks open the pneumatic pressure will act on the piston portion 67 which has a substantially larger area than the cross-section of the port 59. Under this increased pressure the control valve member 65 moves against the spring 71 at great speed.

The outlet port 69 opens to a continuation 72 of the pneumatic pressure supply conduit 56 leading to the port 39 in the far end of the main cylinder 37. Conduit 72 has two branches 74 and 75. Branch 74 is connected to the upper port 76 in a vent valve 77 and branch 75, which contains a constrictor 78, is connected to the single acting lifting jack 19.

An air inlet pipe 79 leads from the nozzle 23 at about the same level that the tube 41 exits therefrom. The pipe 79 leads to the lower port 81 of the air vent valve 77. This vent valve 77 is in the form of a cylinder having an internal inwardly directed flange 82 which forms a seating for a ball valve 83 that is located in one-half of the cylinder 77 and is spring urged into the closed position. A release piston 84 having a depending stub 85 works in the other half of the cylinder 77. A vent 86 is formed in this half of the cylinder 77. Normally this valve 77 is closed, but when the conduit 72 is connected to the air supply by the control valve, the pressure acts on the release piston 84 to move it towards the internal flange 82 so that the stub 85 engages the ball 83 to lift it off the seating 82 thus connecting the air pipe 79 to the vent 86.

An adjustable collar 87 having lower spacing lugs 88 is attached to the nozzle 23 by screws to control the entry of the nozzle 23 into the cask 89.

In use, a cask 89 is brought to the operating station by means of a conveyor or any other suitable means (not shown) and is arranged with its bung hole 91 uppermost. An operator then places the nozzle 23 into the cask 89 through the bung hole 91 until the collar 87 rests on the cask 89. The operator then turns the manually operable valve 49 to the "Fill" position. Pneumatic pressure is then supplied from the air supply to the first port 54, and through the valve 57 to the second port 55 and thus to the pneumatic pressure supply conduit 56. The air pressure is fed to port 38 in the cylinder 37 and causes the piston 36 to rise thereby opening the main valve 32. Liquid can now pass from the liquid filling pipe 29 into the cask 89. At the same time, air is being blown through the venturi tube 52 which causes a suction at the throat 51 and, therefore, in the sensing conduit 41. The strength of the spring 71 in the larger chamber 53 is sufficient to maintain the control valve member 65 seating on the port 59 against the pressure of the air in the pneumatic supply conduit 56 and the suction in the sensing conduit 41.

When the liquid in the cask 89 fills up to the level of the port 42, it is drawn up the tube 41 by the suction in the sensing conduit. When there is sufficient head of liquid in the sensing conduit 41, the pressure in this conduit due to the suction at the throat 51 of the venturi tube 52 is sufficient to draw the diaphragm 63 slightly downwardly so as to cause the control valve member 65 to crack open. When the control valve member 65 cracks open the air enters into the valve chamber 6 and immediately causes the control valve member 65 to move into its open position. The air pressure is now connected to the pneumatic supply conduit 72 which via branch 73 supplies air to the other end of the motor cylinder 37. This air pressure combined with the effect of the spring 40 acts on the piston 36 to move the main valve 32 into the closed position. At the same time, pressure is supplied to the lifting jack 19 which then lifts the nozzle 23 from the bung hole 91. Also simultaneously with this operation the release piston 84 moves downwardly and acts on the ball valve 83 to move this from its seating 82. Thus as the nozzle 23 is lifted from the cask 89, any liquid remaining in the nozzle 23 will drain back into the cask 89 as the upper end of the nozzle 23 is connected to the atmosphere. The effect of the restrictor 78 is to allow this pressure release to take place before the nozzle 23 leaves the cask.

The operator then moves the valve 49 to the "Reset" position and the air from the cylinders purges the tube 41. Further, as the valve chamber 66 will be no longer connected to pneumatic pressure when the main pistons reach a position of rest, the control valve member 65 will be moved by the spring 71 to its closed position. The nozzle device is now ready to fill another cask.

The shuttle valve 43 is provided to prevent the intake of liquid into the sensing conduit 41 under conditions of surge which sometimes are encountered when filling containers. This shuttle valve 43 comprises a shuttle or float 92 which normally is in an inoperative position in the shuttle valve 43. If, however, there is a sudden surge of liquid, the shuttle 92 is carried upwards and seals against the suction port 93.

A screw (not shown) is provided for tensioning the valve spring 71 so that the amount of suction required to open the valve member 65 may be adjusted.

As an alternative to the air inlet valve 77 shown in FIGURE 2, a modified air inlet valve 94 as shown in FIGURE 3 may be used. This air inlet valve 94 comprises a valve chamber 95 having upper and lower ports 95a and 95b, the upper (95a) of which opens to the atmosphere and is sealed by a non-return ball valve 96 spring urged on to its seating formed by the port 95a. The lower port 95b is connected to one arm 97 of a U-shaped pipe 98 which leads into the nozzle 23 and the other arm 99 of which enters the nozzle 23 and faces the main valve 32. When the nozzle 23 is lifted, the back pressure due to the volume of liquid in the nozzle opens the non-return valve 96 so that air enters into the nozzle 23 through the pipe 98 allowing the liquid to escape.

When filling casks 89 which have bung holes 91 only slightly greater than the dimensions of the nozzle 23 there may be a substantial back air pressure sensed by the sensing tube 41. In order to compensate for this, a balance line 101 (see FIGURE 4) may be taken from the nozzle 23 slightly above the position at which the sensing tube 41 passes therefrom. This balance line 101 is connected to the vent port in the main chamber 53a of the valve casing. In this way the diaphragm 63a will be under balanced pressure until the sensing orifice at port 42 is covered with liquid.

A modified, theoretically simpler, nozzle device is shown in FIGURE 5. In this device there is again a nozzle 102 leading from a main valve controlled header chamber 103, the main valve 104 being secured to the piston rod 105 of a piston 106 acting in a cylinder 107 and being urged by a spring 108 to move the valve 104 into the closed position. In this case, however, the nozzle 102 is itself in the shape of a venturi tube. A sensing tube 109 enters the throat 111 of the venturi shaped nozzle. The sensing tube 109 is connected by a thin conduit 112 and port 113 to a larger chamber 114 of a control valve 115 (which is generally similar to the valve 22 shown in FIGURE 2). This valve 114 has, however, two ports 113 and 116 in the underside of the larger chamber 113. To the second of these ports (116) is connected by a flexible conduit 117, an adjustable sensing probe 118. This adjustable sensing probe 118 can be introduced into the container separately of the nozzle 102 with its sensing orifice 118a at the level to which the liquid is to be filled in the container. A vernier device 119 is provided whereby the location of the adjustable sensing probe 118 relative to the nozzle 102 may be varied.

Air under pressure is supplied through a feed conduit 121 into one (123) of the three ports 123, 124 and 125 of a two-position manually operable inlet valve 126. When in the "Fill" position (as shown) this valve 126 connects the inlet port 123 to the feed port 124 which is connected to a feed conduit 127. The feed conduit has two branches 128 and 129. One (128) of these branches leads to the underside of the piston 106, whilst the other branch 129 leads to the inlet port 131 of the control valve member 132. A connecting conduit 133 leads from a secondary port 134 in the valve chamber to the upper side of the piston 106.

In use when it is desired to fill a container, the manually operable valve 126 is turned to the "fill" position and liquid under pressure is supplied via the branch 128 to the underside of the piston 106. This lifts the piston 106 against the influence of the spring 108 and opens the liquid valve 104. The liquid may now pass from the header chamber 103 through the nozzle 102 and into the container. The sensing tube 109 will be subject to suction and will draw air through the sensing orifice 118a, sensing probe 118 and conduit 117, the diaphragm chamber 114 and the conduit 112. When the liquid 135 in the container reaches the orifice 118a of the sensing probe 118, it will be drawn up by the suction therein. When a sufficiently high head of liquid is drawn into the probe 118, further suction in the sensing tube 109 will move the diaphragm 136 slightly downwardly. This will crack open the valve control member 132. Because of the increased area now available to the pneumatic pressure, the control valve member 132 will immediately be forced to its fully open position and the branch 129 will now be in contact with the connecting conduit 133 via the ports 131 and 134 in the valve chamber. The pressure now being supplied to the upper end of the main cylinder 107 will urge the piston 106 downwardly to close the valve 104. The parts are shown in FIGURE 5 at the commencement of this downward motion. When the nozzle 102 and the sensing probe 118 are clear of the liquid in the container, the valve 126 is turned to the "Vent" position so that the air in the system may return to atmosphere. Thus the diaphragm valve member will close and the pressure under the piston will be neutralised. It is appreciated, of course, that in this arrangement, various parts described in relation to the preceding embodiment (such as the surge protector, the nozzle vent device and the pressure balancing conduit) may be incorporated as so desired.

Referring now to FIGURE 6, a further modified system is shown. This system is very similar to the system of FIGURE 2. In this system there are three pneumatic piston and cylinder motors 141, 142 and 143 provided. One of these motors (141) is a double-acting motor whilst the other two (142 and 143) are single-acting motors. One side of the double-acting motor 141 and one of the single-acting motors 142 are connected to the primary pneumatic conduit 144. The other single-acting motor 143 and the other side of the double-acting motor 141 are connected to the secondary pneumatic conduit 145. Thus, in use, the single-acting motor 142 and the double-acting motor 141 operate when the main valve 146 is positioned so that the primary pneumatic conduit 144 is connected to the source of pneumatic pressure. When the control valve 147 cracks open as described above, the second single-acting motor 143 and the other side of the double-acting motor 141 are connected to the pneumatic pressure. This causes the second single-acting motor 143 to operate and also to return the double-acting motor 141 to its initial position. In this arrangement, the second single-acting motor is, or corresponds to, the lifting motor of the FIGURE 2 embodiment.

The arrangement shown in FIGURE 6 is suitable for the phased sequence of a number of other control devices. In one arrangement, a pair of nozzle devices as herein shown may be used. The second nozzle device may be used for a "topping up" process and may deliver the liquid at a much slower rate. Thus the primary nozzle may supply liquid at 100 to 150 gallons per minute whilst the secondary nozzle will supply the liquid at say 10 gallons per minute. A first sensing probe will then operate to switch off the primary nozzle shortly before the cask has reached its full position and, say, the double-acting motor will operate to bring the secondary nozzle into effect which will then top up the cask to very near to bung full. With this slowly filling nozzle, a more accurate control of the filling can take place. However, it may well be necessary for the final filling up to the bung full condition that hand filling will be required.

It is also to be noted that in the FIGURE 6 embodiment, the main valve 146 is a three position valve. Thus, if desired, the purging operation may take place under pressure from the pneumatic supply.

When the apparatus is to be used for filling pressurised containers 151, such as occurs when filling beer or carbonated water, the arrangement shown in FIGURE 7 may be used. A tube 153 leads from the preset level inside container 151 into the apex of the expansion chamber 152 which is conveniently conical as shown in FIGURE 7. The part 153 may run inside or outside the filling nozzle, or independently thereof as shown. The open lower end of the sensing conduit 154 projects into the lower base corner 155 of the expansion chamber 152 below the upper end of tube 153. The trough has an opening 163 which is fitted with an elastomer seating or valve mechanism which allows the expansion chamber 152 to drain freely when the filling mechanism has been withdrawn from the container, but which is closed by the pressure of the filling mechanism or by air pressure or by mechanical means, during the filling operation. The upper base corner of the expansion chamber has a vent opening 158, closable by a valve 159 by manual operation or by mechanical means not shown here. An orifice plate 164 may be provided in tube part 153.

In use during filling, a little of the pressure gas can escape through the vent opening 158. When the liquid 161 reaches the sensing orifice 162 at the end of tube 153, the gas pressure forces the liquid up tube 153 into the expansion chamber 152, flooding the trough at 155 to close off the lower end of tube 154, to operate the diaphragm, as described.

On the purging cycle described above, the tube part 154 and trough part 155 will be cleared through the opening 163, while the filling mechanism is being withdrawn from the container. The tube part 153 will be cleared when the filling mechanism has been placed into the container and valve mechanism 163 has been closed by this action, while the vent opening 158 has been closed momentarily, manually or by mechanical means (not shown).

When filling pressurised containers, a pressure-tight seal must be maintained around the filling nozzle and sensing tube. This may conveniently be done by an air cylinder pressing the mechanism into the bung, against a sealing ring. This air cylinder would be connected to the mechanism opening the filling valve, working simultaneously. Another convenient method of sealing is by means of an inflatable elastomer member around the filling nozzle and sensing tube, which will be expanded by air pressure from the actuating cylinder of the control valve.

The invention is not limited to the precise constructional details hereinbefore described with reference to the drawings. Thus, for example, where the level of turbulent liquid is being measured, a number of sensing tubes may be provided at suitably spaced locations. Thus, if one or more sensing tube orifices are covered because of the turbulent condition of the liquid, there will still be sufficient leakage through the other sensing tube orifices so that the diaphragm valve is not actuated. The diaphragm valve will only be actuated when all the sensing tube orifices are covered.

The nozzles may be arranged in bank all being fed from a common feed chamber so that a plurality of containers may be simultaneously filled. The various nozzles with their probes would serve to ensure that each of the containers being filled would be filled with the appropriate and correct amount. It will be also understood, of course, that a plurality of nozzles may be provided leading to each container so that a plurality of different liquids may be fed to the container respectively through the nozzles. The main pneumatic valve may be automatically controlled, for example, by a flow meter or other measuring device. Also the same liquid may be delivered to the container from two nozzles delivering at different rates. Such nozzles, when as described above, need have no interconnection and may be arranged so that the faster filling nozzle closes before the slower.

The apparatus may be adapted for filling all manner of liquids. It is applicable to controlling the flow of solids, e.g. powder through a control valve, into a liquid, as the volume of the solids will cause a rise in the liquid level, which rise can be detected as described. The nozzles, conduits, etc. are preferably made from a material which is inert to the liquid being handled. Conveniently this material may be stainless steel or one of the more inert types of synthetic materials.

Diaphragms and bellows may, where appropriate, be substituted for pistons and vice versa. The detail design of the valve elements may vary between poppet and slide or piston valves.

A vacuum pump may be provided instead of the venturi to provide the suction at the pressure sensitive diaphragm valve.

We have found that the apparatus of the invention provides an accurate level control device. The particular embodiments described are very suitable for filling not only casks but various other containers, such as storage tanks, plastic containers, cartons containing plastic containers and conventional glass or other containers. The apparatus of the invention may be used for filling non-rigid containers and others which cannot sustain an airtight seal around the filling opening.

Further, the level cotrol device of the invention may be put to various uses. In particular it may act to initiate a new process when the level is attained. The device may be arranged to open a valve to dump the contents of a tank when a preset level is reached. Thus, for example, a combination of two valves can maintain a liquid level between pre-set limits.

Also instead of pneumatic pressure for operating the various cylinders, these may be hydraulically operated and the valve 53 would be an hydraulic valve.

We claim:

1. Apparatus for controlling the flow of material through a flow line comprising a main valve in the flow line, a pressure fluid operated piston and cylinder motor connected to control said main valve, a pressure fluid supply conduit which is separate from said flow line and which connects said motor to a source of pressure fluid, a control valve in the said supply conduit, a sensing conduit having an orifice therein and means for causing a flow through said orifice, said control valve incorporating a control valve member and a pressure sensitive actuating mechanism sensitive to the pressure in said sensing conduit and connected to actuate said control valve member, so that when the orifice is obstructed the pressure sensitive actuating mechanism is subjected to a changed pressure so as operatively to move the control valve member thereby to control said pressure fluid operated motor, said control valve comprising a casing having an inlet port and an outlet port and said control valve member disposed within said casing at the downstream side of the inlet port and operating to close and open the inlet port to close off and open communication between said inlet and outlet ports, which control valve member and when moved off said port exposes an enlarged pressure surface to the pressure of the fluid at said port so that said control valve member becomes subject to an increased valve opening force; the aforesaid motor constantly communicating with said pressure fluid supply conduit upstream of said control valve for biasing said main valve to the open position and intermittently communicating with the pressure fluid supply conduit via said control valve for effecting closing said main valve.

2. Apparatus as claimed in claim 1 further comprising spring means acting to bias said main valve to the closed position.

3. Apparatus as claimed in claim 1 wherein a vented expansion chamber is provided into which said orifice in the sensing conduit opens.

4. Apparatus as claimed in claim 3 wherein said expansion chamber has a bottom opening which is adapted to be closed when the apparatus is in use.

5. Apparatus as claimed in claim 1 further comprising an expansion chamber into the lower part of which said orifice in the sensing conduit opens, a second conduit extending upward into the expansion chamber and opening to the said expansion chamber at a level above that of said orifice, and a venting aperture in the upper portions of the expansion chamber.

6. Apparatus as claimed in claim 1 wherein said pressure sensitive actuating mechanism comprises a chamber communicating with the sensing conduit, a diaphragm movable in said chamber and a rod connecting the diaphragm to the movable member of the control valve.

7. Apparatus as claimed in claim 1 further comprising a venturi tube opening from said pressure fluid supply conduit at the upstream side of the control valve, said venturi having a throat to which the sensing conduit opens, thereby to cause said flow through the orifice.

8. Apparatus as claimed in claim 1 wherein the flow-causing means comprises a filling nozzle in the shape of a venturi tube at the end of the flow line, and a sensing tube passing through the wall of the nozzle to the throat of the nozzle, the said sensing tube being connected to the pressure sensitive actuating mechanism to apply negative pressure thereto.

9. Apparatus as claimed in claim 8 wherein said additional fluid pressure operated means is connected to lift and lower the nozzle for removal and insertion into a cask or like container.

10. Apparatus as claimed in claim 1 comprising at least one additional fluid pressure operated means controlled by the control valve.

11. Control apparatus comprising the combination of a main valve, a piston and cylinder motor constituting fluid pressure operated means connected to operate the main valve, a control valve for controlling said motor, and detector means to actuate said control valve; said detector means comprising a sensing conduit having an orifice at one end; and means for causing a flow along said sensing conduit and through said orifice; said control valve comprising a valve chamber having an inlet port, which is of smaller cross-section than said valve chamber, and an outlet port; a control valve member disposed within said control valve and at the downstream side of and seating against the inlet port and being subject to the pressure at the inlet port, of which said pressure acts to lift said valve member off said inlet port to place the inlet port in communication with the outlet port, a piston member connected to the control valve member and fitting within said valve chamber, which piston member is subject to the pressure at the inlet port when the latter is open, and a pressure sensitive member sensitive to the pressure in the sensing conduit between the orifice and the flow-causing means, and connected to move said valve member off the inlet port; and a pressure fluid supply conduit in which said control valve is connected for supplying pressure fluid from a pressure fluid source through said inlet port to said outlet port, said motor constantly communicating with said pressure fluid supply conduit upstream of the control valve for biasing said main valve to the open position and intermittently communicating with said pressure fluid supply conduit via said control valve for effecting closing said main valve.

12. Apparatus as claimed in claim 11 further comprising spring means biasing the valve member onto the inlet port.

13. Control apparatus comprising the combination of a main valve, a piston and cylinder motor connected to operate the main valve, a control valve for controlling said motor and detector means to actuate said control valve; said detector means comprising a sensing conduit having an orifice at one end; and means for causing a flow along said sensing conduit and through said orifice; said control valve comprising a valve chamber having an inlet port, which is of smaller cross-section than said valve chamber, and an outlet port, a control valve member disposed within said control valve and at the downstream side of and seating against said inlet port and being subject to the pressure at the inlet port of which said pressure acts to lift said valve member off said inlet port to place said inlet port in communication with said outlet port, a piston member slidably mounted in the valve chamber and carrying the valve member, said latter piston member being subject to the pressure at said inlet port when said valve member has been lifted off said inlet port, a diaphragm chamber, a diaphragm in said diaphragm chamber connected to said latter piston and valve members to move the latter, said diaphragm chamber on one side of said diaphragm communicating with said sensing conduit between said orifice and said flow-causing means, with the pressure in said sensing conduit tending to lift said valve member off said inlet port; and spring means biasing said valve member onto said inlet port; and a pressure fluid supply conduit in which said control valve is connected for supplying pressure fluid from a pressure fluid source through said inlet port to said outlet port; the aforesaid motor constantly communicating with said pressure fluid supply conduit upstream of said control valve for biasing said main valve to the open position and intermittently communicating with said pressure fluid supply conduit via said control valve for effecting closing said main valve.

14. Apparatus as claimed in claim 13 wherein said sensing conduit means comprises two parts, one of which parts is connected at its ends respectively to said flow-causing means and to a port in the diaphragm chamber on the said one side of the diaphragm, and the other of said parts is connected at its ends respectively to said orifice and to a second port in said diaphragm chamber on the said one side of the diaphragm.

15. Apparatus as claimed in claim 13 comprising a plurality of sensing conduits each terminating in an orifice and being in communication with the diaphragm chamber, the arrangement being such that one or more but not all of the orifices can be closed without affecting the effect on the diaphragm of the pressure in the conduit means.

References Cited
UNITED STATES PATENTS

| | | | |
|---|---|---|---|
| 1,115,505 | 11/1914 | Chapin | 141—59 X |
| 2,354,631 | 7/1944 | Williamson | 251—75 X |
| 3,033,170 | 5/1962 | Norton et al. | 91—417 X |
| 2,222,923 | 11/1940 | Warrick | 141—225 X |
| 2,402,036 | 6/1946 | Giger | 141—225 |
| 2,489,028 | 11/1949 | Graham et al. | 141—225 |
| 2,803,269 | 8/1957 | Switzer | 141—250 |
| 3,043,349 | 7/1962 | Bennett | 141—198 X |
| 3,199,728 | 8/1965 | Taylor et al. | 141—225 X |
| 3,254,683 | 6/1966 | Jennings et al. | 141—198 X |
| 3,313,326 | 4/1967 | Pellerino | 141—198 X |

FOREIGN PATENTS 101,546   7/1937   Australia.

LAVERNE D. GEIGER, Primary Examiner

E. J. EARLS, Assistant Examiner

U.S. Cl. X.R.

141—198, 279